United States Patent
Mathsen et al.

(10) Patent No.: US 8,048,668 B1
(45) Date of Patent: Nov. 1, 2011

(54) SYSTEM AND METHOD OF AERATION FOR COMPOST PROCESSES

(75) Inventors: Don V. Mathsen, Grand Forks, ND (US); Calvin R. Tininenko, Grand Folks, ND (US); Rodney J. Kleven, Grand Forks, ND (US)

(73) Assignee: Bactee System, Inc., Grand Forks, ND (US)

( * ) Notice: Subject to any disclaimer, the term of this patent is extended or adjusted under 35 U.S.C. 154(b) by 1165 days.

(21) Appl. No.: 11/725,897

(22) Filed: Mar. 20, 2007

(51) Int. Cl.
*C12M 1/00* (2006.01)

(52) U.S. Cl. ..................... 435/290.1; 210/610

(58) Field of Classification Search .... 435/290.1–291.8; 210/170.07, 170.08, 603, 606; 47/1.4
See application file for complete search history.

(56) References Cited

U.S. PATENT DOCUMENTS

| | | | | |
|---|---|---|---|---|
| 4,521,517 A | * | 6/1985 | Gauthier | 435/290.1 |
| 6,383,803 B1 | * | 5/2002 | Allen et al. | 435/290.1 |
| 2005/0260744 A1 | * | 11/2005 | Campbell | 435/290.2 |

* cited by examiner

*Primary Examiner* — William H Beisner
*Assistant Examiner* — Michael Hobbs
(74) *Attorney, Agent, or Firm* — Dennis L. Thomte; Thomte Patent Law Office LLC

(57) ABSTRACT

A composting aeration system is provided with a central air duct that is placed in open fluid communication with a plurality of elongated aeration strips, which form a portion of a supporting surface for composting material. One or more aeration hubs or manifolds may be used to place the aeration strips in open fluid communication with the central air duct. The aeration hubs may be provided to selectively vary the fluid flow through the system and substantially limit the passage of debris from the aeration strips to the central air duct. Components to the system are removably coupled with one another to provide ease of cleaning and maintenance between composting operations.

2 Claims, 11 Drawing Sheets

SYSTEM AND METHOD OF AERATION FOR COMPOST PROCESSES

BACKGROUND

Composting operations have become abundant across the country, producing valuable soil amendment material while effectively reusing waste materials. More recent operations are using variations of the 'aerated static pile' method to enhance the compost process by forcing and controlling air movement through the composting material. This requires a method of aerating the material by inducing air through the bulk material in a uniform manner.

Positive aeration systems introduce air at the bottom of a pile or windrow and force it upwardly until it is dispersed to the atmosphere or, if contained in an enclosure, treated for removal of noxious odors and volatile organic compounds (VOC) prior to release to the atmosphere. Negative aeration systems draw air downwardly through a pile or windrow allowing total capture of the process air for subsequent treatment by a biofilter or other means of odor and VOC removal. Some aeration systems reverse the air flow through a pile or windrow thus operating at times as a positive aeration system and, alternately, as a negative aeration system.

Conventional positive and negative aeration systems may consist of a plurality of parallel, equally-spaced pipes typically on centerline distances of 2' to 6' placed at the base of the composting material. The pipe walls typically contain holes less than 0.75 in. diameter on their surfaces at equal intervals along the length of the pipes. In some cases, pipes are placed beneath the pile of material with spigots extending upward from the pipes to the base of the composting material. In either case, these arrangements create a grid of openings from which air enters or leaves the composting material.

These current systems suffer from one or more faulty characteristics such as: high static head losses along the length of the pipes and across the small holes, high jet velocities within the material in the proximity of the pipe holes, difficult or impossible cleaning access to the internal surfaces of the pipes, clogging of the holes particularly in negative aeration, and the need to move and replace pipe prior to removal and/or replacement of the composting material.

Accordingly, what is needed is a novel system and method for efficiently providing uniform aeration to an aerated compost process that has a low operating cost, provides uniform air introduction and removal within a pile or windrow, simplifies cleaning and maintenance, and does not require manual manipulation of the aeration equipment during removal and replacement of the composting material. This novel system must contain all of the above features while allowing heavy equipment and the use of large buckets and other material handling equipment to traverse the aeration components without undue wear or damage.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A negative composting aeration system of the present invention is generally provided with a central air duct having a first end portion, an open second end portion, a length that extends between the first and second end portions, and an open air channel that extends along at least a portion of the central air duct's length. A plurality of elongated aerations strips, each having first and second end portions, a support surface that extends between the first and second end portions, and an open airway beneath the support surface, are placed in open fluid communication with the open air channel of the central air duct. A plurality of vent openings are provided in the support surfaces to allow air to be either drawn into or emitted from the aeration strips. An air-handling means is provided for transporting air between the open air channel from within the plurality of aeration strips and out the second end portion of the central air duct. In use, organic material is positioned closely adjacent the support surfaces of the aeration strips. The air-handling means may then be actuated so that air is either drawn through or emitted to the organic material, transported through the open airways within the aeration strip and through the open air channel of the central air duct.

In one preferred embodiment, one or more aeration hubs, having open first and second end portions and an airway extending between the first and second end portions, may be provided to place the open airway of one or more of the plurality of aeration strips in open fluid communication with the open air channel of the central air duct. In one aspect of the invention, the aeration strips may be positioned to extend away from the central air duct at an angle with respect to the length of the central air duct in order to maximize the area occupied by the aeration strips beneath the organic material. In another aspect, the aeration strips may be positioned to be in a spaced-apart relationship with one another, along the length of the central air duct, so that aeration strips extending away from either side of the central air duct are separated by portions of an operating surface that supports portions of the organic material. Still another aspect of the invention provides the aeration strips as removable members that are positioned within grooves formed in the operating surface so that the support surface of the operating strips is positioned flush with the operating surface.

The aeration hubs may be provided in a number of different embodiments to help selectively control fluid flow through the system. In one embodiment, openings at the upper end portion of the aeration hubs are shaped to limit the flow of debris from the open airway of the aeration strips into the open air channel of the central air duct. In another embodiment, a valve is positioned within one or more of the aeration hubs to selectively control the flow of air through the system. Still another embodiment provides an air control insert that is rotatably coupled within the first end portion of one or more hubs. The air control inserts may be rotated to provide varying degrees of air flow control to the system. Another aspect of the invention provides a manifold, having a length and an open airway that places the aeration strips in open fluid communication with the open air channel of the central air duct. Various embodiments may incorporate the use of both aeration hubs and manifolds to create variable sections within a single composting system.

It is therefore a principal object of the present invention to provide a composting aeration system that is durable, yet relatively simple to clean and maintain.

A further object of the present invention is to provide a composting aeration system that utilizes a plurality of elongated aeration strips, which are positioned along an operating surface that supports composting material, in open fluid communication with a central air duct that is adapted to transport fluid to or from within the aeration strips.

Still another object of the present invention is to provide a composting aeration system that positions a plurality of elongated aeration strips to extend outwardly at angles from a central air duct.

Yet another object of the present invention is to provide a composting aeration system that utilizes a plurality of aeration strips, within an operating surface, that are placed in open fluid communication with a central air duct via one or more aeration hubs.

A further object of the present invention is to provide a composting aeration system that utilizes a plurality of aeration hubs to vary the fluid flow through the system.

Still another object of the present invention is to provide a composting aeration system that utilizes aeration hubs, which are designed to limit the flow of debris into a central air duct from a plurality of elongated aeration strips.

Yet another object of the present invention is to provide a composting aeration system that is relatively inexpensive to assemble and operate.

These and other objects of the present invention will be apparent to those having skill in the relevant art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
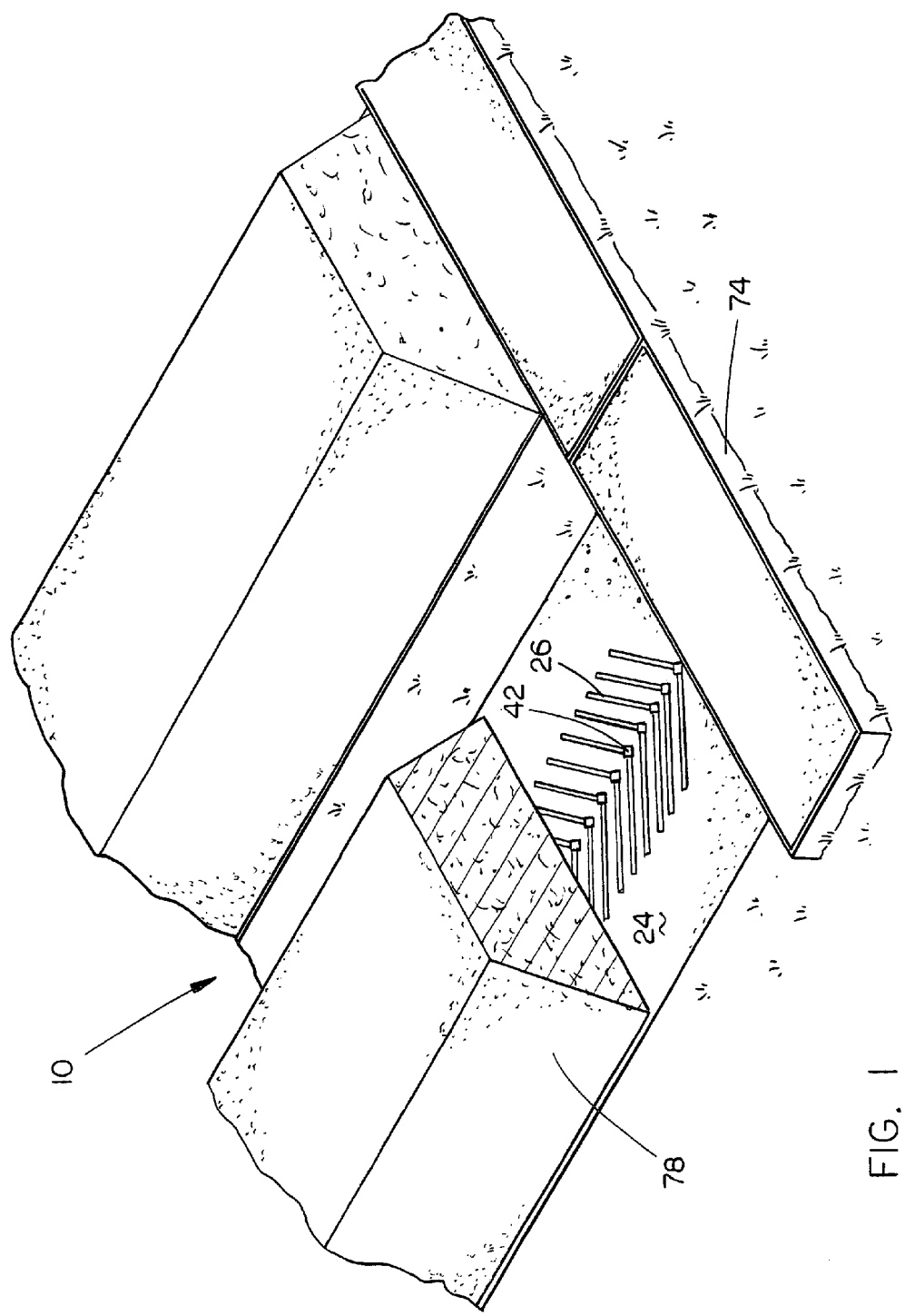
FIG. 1 is a partial perspective view of one embodiment of the composting system of the present invention demonstrating one potential use of such a composting system.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The composting aeration system 10 of the present invention is generally provided with at least one central air duct 12, having a first end portion 14, an open second end portion 16, a length that extends between the first end portion 14 and the second end portion 16, and an open air channel 18 that extends along at least a portion of the length. In one preferred embodiment, the central air duct 12 may be positioned within an elongated channel 20, formed at least partially below ground. The elongated channel 20 is preferably formed to be larger in diameter than the central air duct 12. The void around the central air duct 12, when positioned within the elongated channel 20, may be filled with aggregate material. A sub-floor 22, comprised of a suitable material, may then be layered over the central air duct 12 and the elongated channel 20. In one preferred embodiment, a deck surface 24 is then positioned atop the sub-floor 22 to provide a suitable operating surface to support a substantial portion of the organic material to be composted. The circumstances presented, including environmental conditions and use of the system 10 may dictate the material selected, the layers of construction and their positioning with respect to one another. The construction of the deck surface 24 will preferably; (1) be sufficiently flat to minimize surface wear with the use of front-end loaders and similar heavy equipment; (2) structurally support extreme loading conditions presented by the combined torque and vertical loads exerted by common heavy equipment used in the composting industry; (3) consist of a material resistant to wear due to loading forces and the corrosive and erosive effects of leachate and the biochemical environment of the compost process; and (4) be economical to install and maintain. In at least one preferred embodiment, materials such as concrete, soil cement, or an asphalt mix satisfy the aforementioned requirements.

Figure 4:
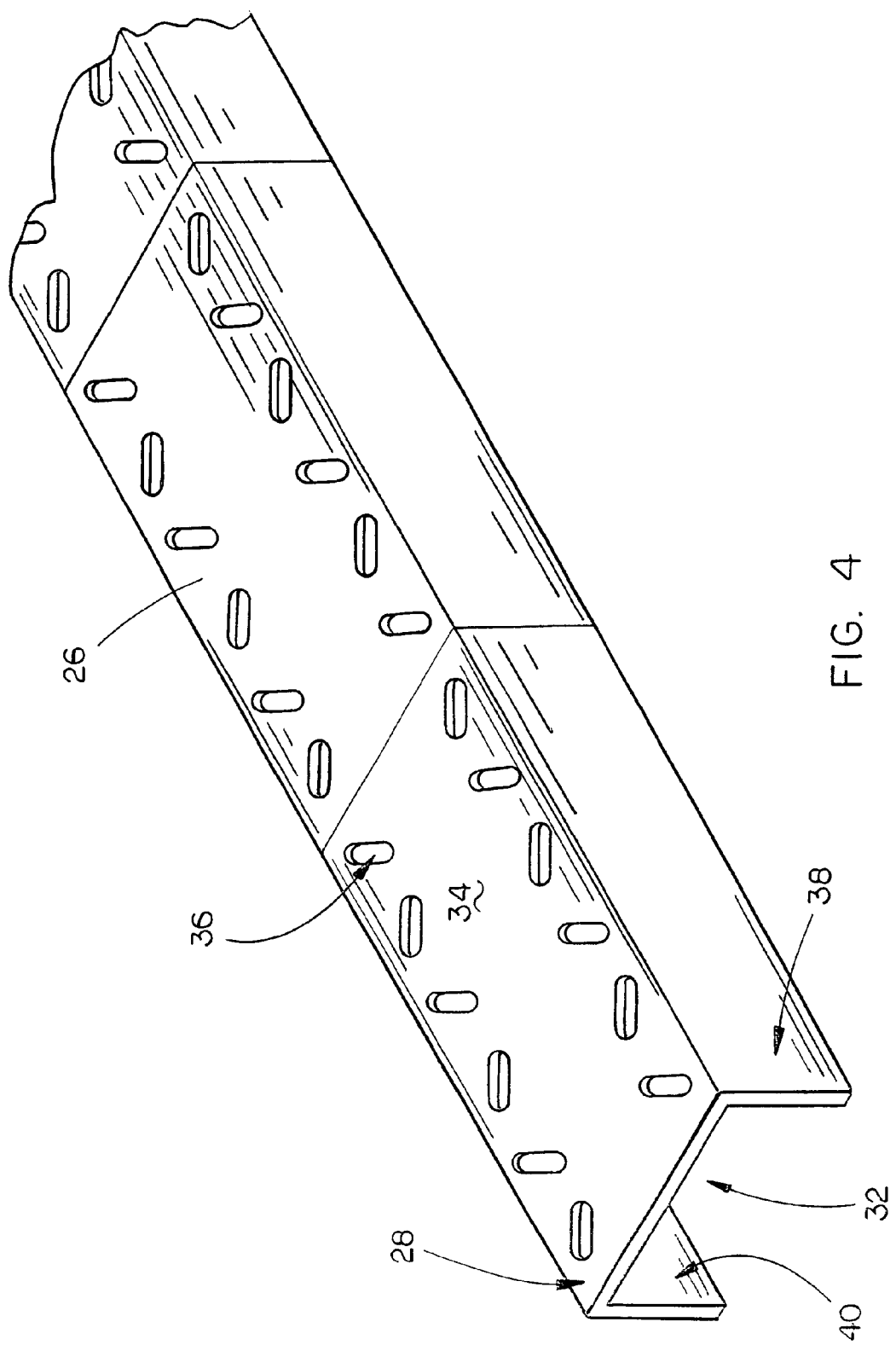
FIG. 4 is a partial isometric view of one embodiment of an aeration strip that may be used with the composting system of the present invention.

The system 10 is further provided with a plurality of elongated aeration strips 26, having first end portions 28, second end portions 30 and open airways 32 that extend at least partially between the first and second end portions. The first end portions 28 of the aeration strips 26 are preferably positioned to place the open airways 32 of the aeration strips 26 in open fluid communication with the open air channel 18 of the central air duct 12. While the design of the aeration strips 26 may vary, they will be generally comprised of a support surface 34, having a plurality of vent openings 36 that are positioned to be in open fluid communication with the open airway 32. The vent openings 36 must be spaced with a reasonably close pitch, which is determined by the need to keep the pass-through velocities at a level that is sufficiently low to keep head loss across the vents negligible. In one embodiment, the vent openings 36 are shaped as elongated slots, approximating one quarter inch by one inch with radiused ends, which has demonstrated the ability to minimize material "fall through", intrusion and plugging. In one preferred embodiment, depicted in FIG. 4, the aeration strips 26 are provided with opposing sidewalls 38 and 40 that, in combination with support surface 34, define open airway 32. While it is contemplated that the aeration strips 26 may be positioned partially or completely above the deck surface 24, one preferred embodiment of the system 10 positions the aeration strips 26 within open air channels formed within the deck surface 24 so that the support surface 34 of the aeration strips 26 is generally flush with the deck surface 24. In this position, the aeration strips 26 will not interfere with movement of composting material or equipment across the deck surface 24. This design further enables the aeration strips 26 to be removably positioned for ease of cleaning and maintenance.

In one preferred embodiment, one or more aeration hubs 42, having first end portions 44, second end portions 46 and an open airway 48 that extends between the first and second end portions, couple the aeration strips 26 with the central air duct 12. The first end portion 44 of the aeration hub 42 is preferably placed in open fluid communication with the open airway 32 of one or more aeration strips 26. The second end portion 46 of the aeration hub 42 is placed in open fluid communication with the open air channel 18 of the central air duct 12. One preferred embodiment, depicted in FIG. 2, places a plurality of aeration hubs 42 in a spaced relationship along the length of the central air duct 12. The number of aeration hubs 42, and the distance at which they are spaced from one another, may be pre-selected in order to provide increased or decreased levels of air flow throughout the system 10. While it is contemplated that the aeration hubs 42 could be permanently coupled with the central air duct 12, it will be preferred that the aeration hubs 42 be removably coupled with the central air duct 12 to permit ease of cleaning and maintenance as needed. In one application, openings are formed in the central air duct 12 to receive the second end portions 46 of the aeration hubs 42. The opening may be shaped and sized to allow for the insertion of standard hoses or pipes from mobile vacuum sewer cleaning units in order to make cleaning and maintenance relatively easy.

Figure 7:
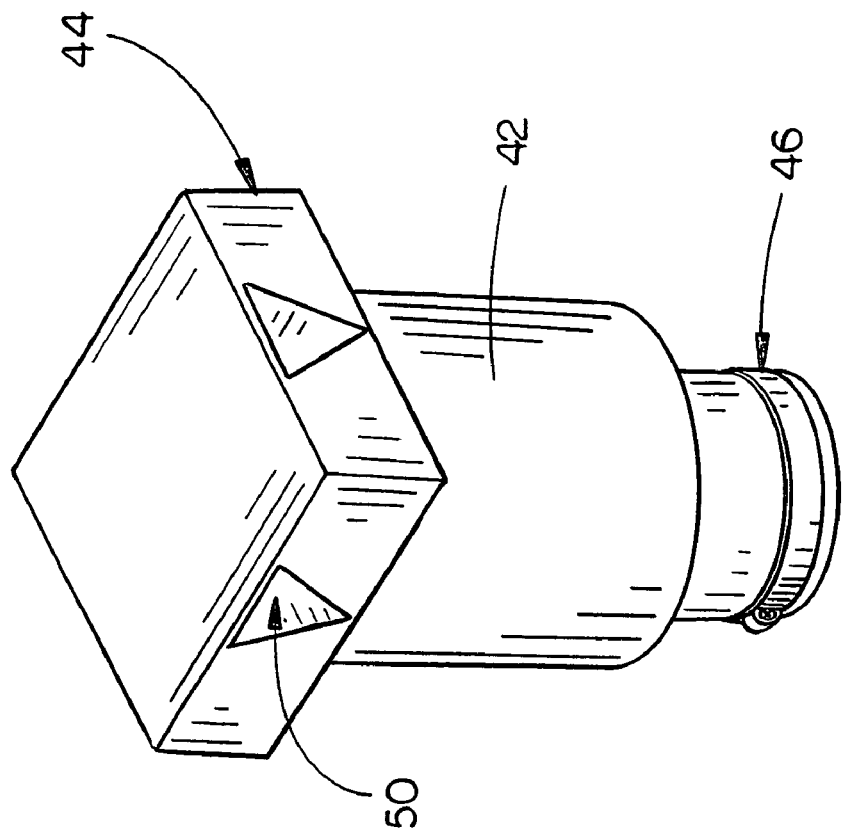
FIG. 7 is an isometric view of one embodiment of an aeration hub that could be used with the composting system of the present invention.
Figure 8:
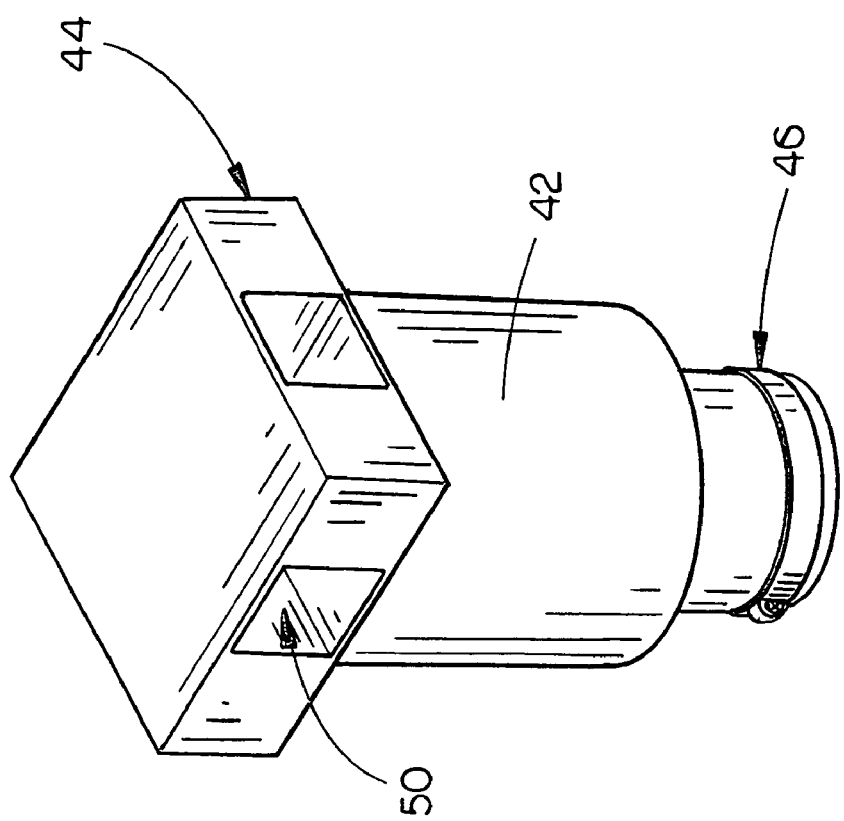
FIG. 8 is an isometric view of another embodiment of an aeration hub that could be used with the composting system of the present invention.

In a preferred embodiment, the first end portions of the aeration hubs 42 are provided with one or more openings that are specifically positioned to place the open airway 32 of the aeration strips 26 in open fluid communication with the open air channel 18 of the central air duct 12. The openings 50 in the aeration hubs 42 may be shaped to reduce the amount of debris allowed to pass from the open airway 32 of the aeration strips 26 into the open air channel 18 of the central air duct 12. In one example, depicted in FIG. 8, the openings 50 are shaped to be more narrow at a lower end portion of the openings 50 than an upper end portion. In the specific example depicted, the side portions of the openings 50 taper inwardly from the top of the openings 50 to form a generally triangular shape. Alternatively, screens 51 may be positioned adjacent openings 50 to minimize particulate entrance into the aeration hubs 42. In other embodiments, however, such as depicted in FIG. 7, the openings 50 may be generally square or rectangular to approximate the open end portions of the aeration strips 26, where trapping debris is less important.

Figure 9:
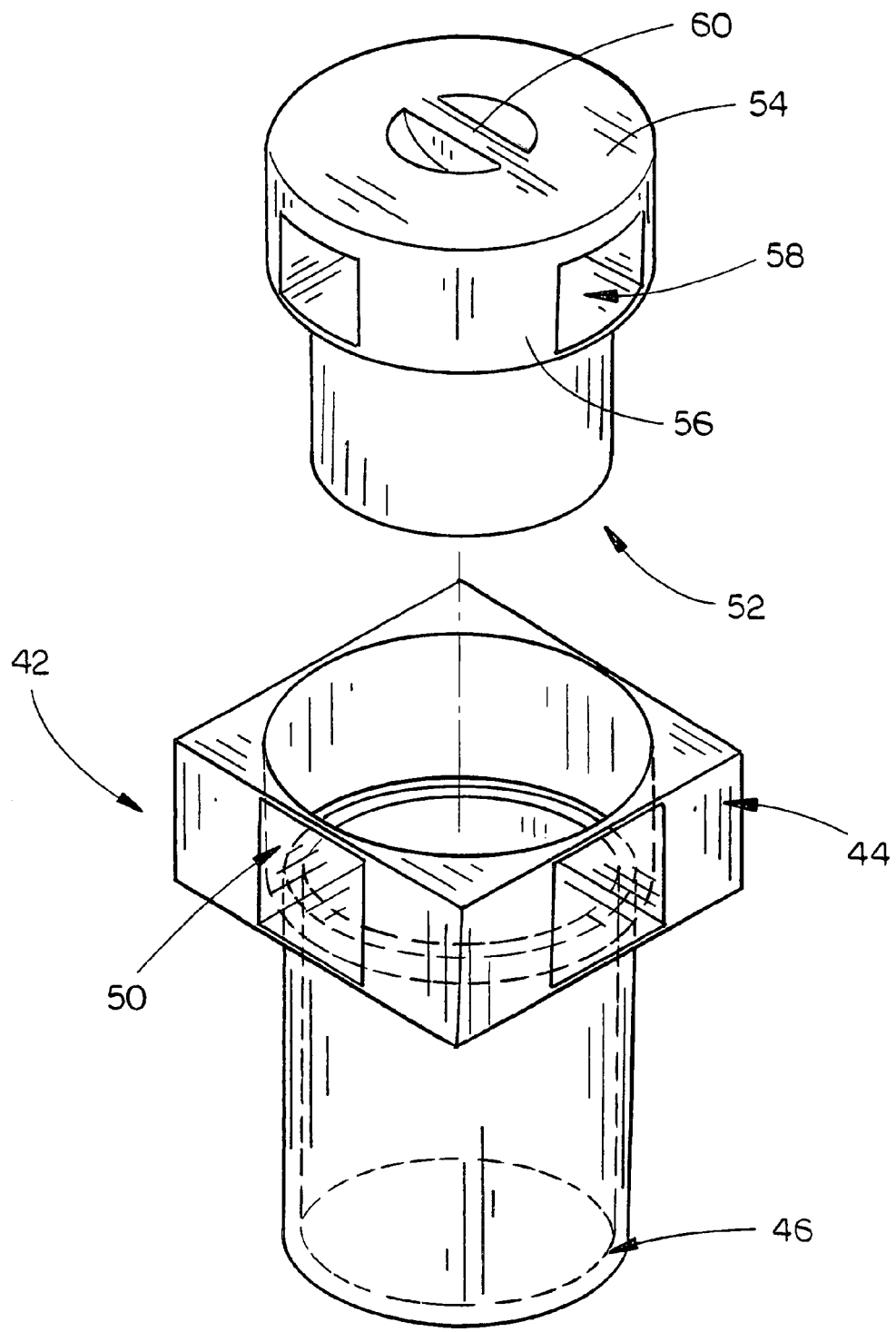
FIG. 9 is an isometric view of yet another embodiment of an aeration hub that could be used with the composting system of the present invention.
Figure 10:
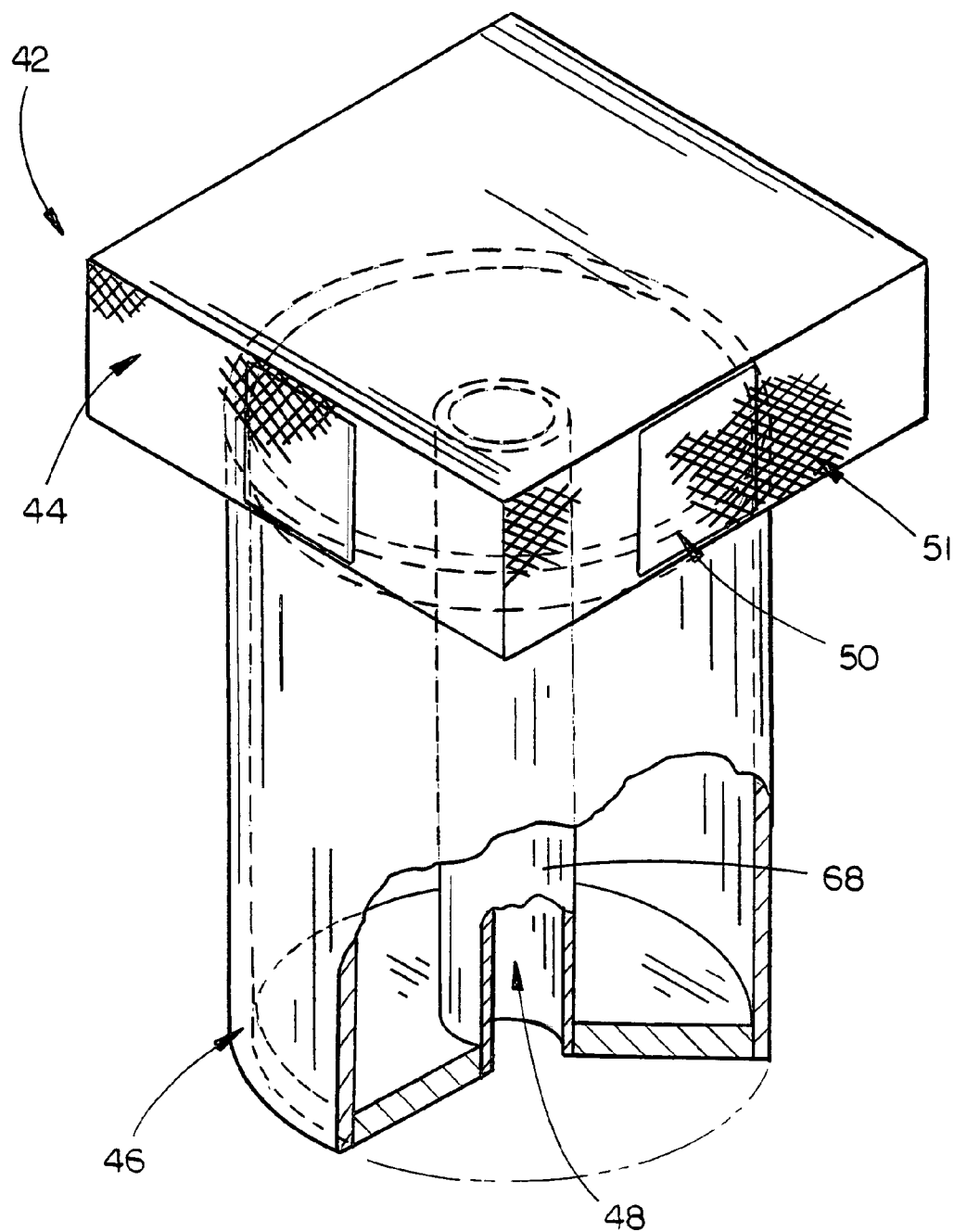
FIG. 10 is an isometric view of still another embodiment of an aeration hub that could be used with the composting system of the present invention.

In various preferred embodiments, one or more aeration hubs 42 may be designed to selectively control a volume of fluid passing through a portion of the system 10 associated with each particular aeration hub 42. In one example, depicted in FIG. 9, an air control insert 52 is rotatably coupled within the first end portion 44 of the aeration hub 42. The air control insert 52 is generally provided with a top wall 54 and generally annular sidewall 56 that extends down from the top wall 54. Air control openings 58 are positioned along the sidewall 56 so that the air control insert 52 may be selectively moved between an open position, which aligns the air control openings 58 with the openings 50, to permit fluid to pass through the open airways 32 of one or more aeration strips 26 to, or from, the open air channel 18 of the central air duct 12, and a closed position which substantially prohibits fluid to pass through the open airways 32 of the aeration strips 26, or from, to the open air channel 18 of the central air duct 12. Such "on" and "off" positioning will be beneficial for isolating aeration segments that are not covered with composting material. It is further contemplated that the air control openings 58 may be provided in various shapes to provide different fluid level control and debris trapping characteristics. A handle 60 may be provided along the top wall 54 of the air control insert 52 so that the air control insert 52 may be manually moved between its open and closed positions. It is further contemplated that various mechanical actuators may be provided for remote operation of the air control insert 52 when desired.

Figure 5:
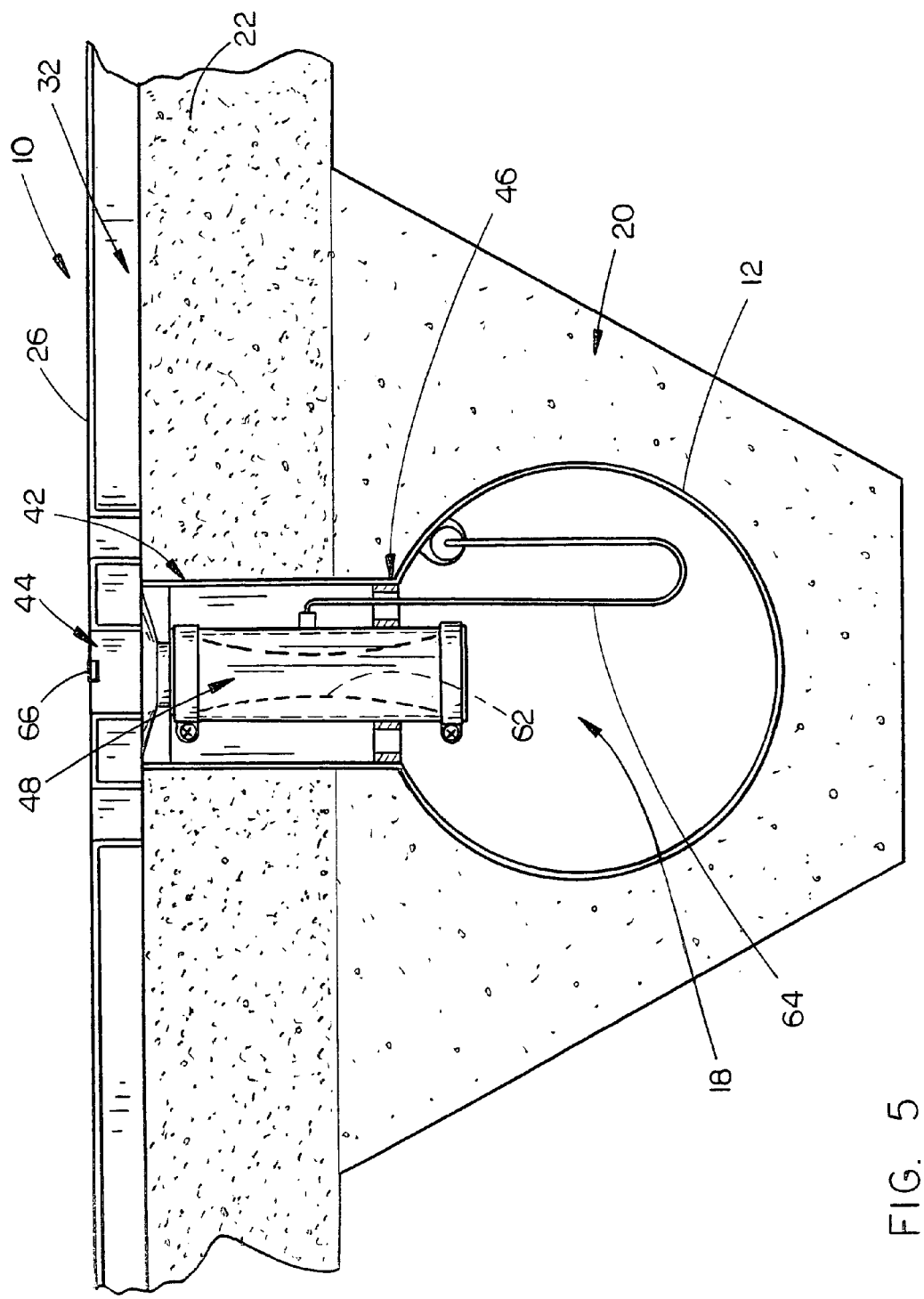
FIG. 5 is a sectional, elevation view of one embodiment of the composting system of the present invention.

In another embodiment, a valve 62 is associated with the open airway 48 of an aeration hub 42. The valve 62 is preferably capable of selective operation to open or restrict the open airway 48 of the aeration hub 42. The example of a pinch valve is depicted in FIG. 5 as one possible valve 62 that may be used. In this example, one or more airlines 64 are associated with the valve 62 and may be housed within the central air duct 12. It will be preferable to provide slack, or a means of connection and disconnection, in the air lines 64 to enable removal of the aeration hub 42 without disconnecting the air line 64. For real-time balancing and control of air flow, active control of the valve 62 may be achieved as a function of air temperature. In one example, a temperature sensor 66 is installed within the aeration hub 42 in a manner that places the temperature sensor 66 into the airstream flowing through the system 10 while separating the temperature sensor 66 from direct exposure to leachate or other materials passing through the system 10. The temperature signal may be transmitted by wireless connection to a central microprocessor. The microprocessor may be provided to modulate the process air flow through each valve 62. The objective with this embodiment will be to maintain the process air temperature at each aeration hub 42, according to a prescribed temperature profile for the process. The controlling activity consists of polling each temperature sensor 66 at a preset time interval and adjusting the respective valve 62 to adjust process air flow at each hub 42. A "most open valve control strategy" may be used to minimize the static head required in the central air duct 12 while allowing the flexibility of individual air control at each aeration hub 42. The pressure in the central air duct 12 for an amount of composting material is maintained by the central control system such that at least one valve 62 along the length of a pile of composting material can be maintained at a full open position while meeting the prescribed temperature profile. This valve 62 becomes the reference against which the other valves 62 of a particular pile of composting material are modulated to maintain the prescribed temperature profile at their respective locations.

In another embodiment, flow control through the system may be controlled using an orifice tube 68 that is shaped and sized to allow a desired level of fluid flow through the open airway 48 of an aeration hub 42. In this manner, use of the fixed orifice tube 68 will provide passive flow moderation that is similar to providing openings 50 with specific, predetermined shapes and sizes. Such structural details serve as flow restrictors to minimize the impact of wide swings in bulk material porosity. If regions of high porosity (less flow resistance) exist within the composting material, the higher velocity that results in these regions will be moderated by an increased velocity and static loss across the flow control orifice tube 68 associated with that region of the material. This will minimize, but not eliminate, flow differentials through the pile of composting material that can result in excessive channeling, uneven microbial activity and material drying.

Providing either the openings 50 or the orifice tube 68 with smaller, cross sectional areas will increase the moderation level but at the expense of an overall increase in static head loss through the system 10.

Figure 2:
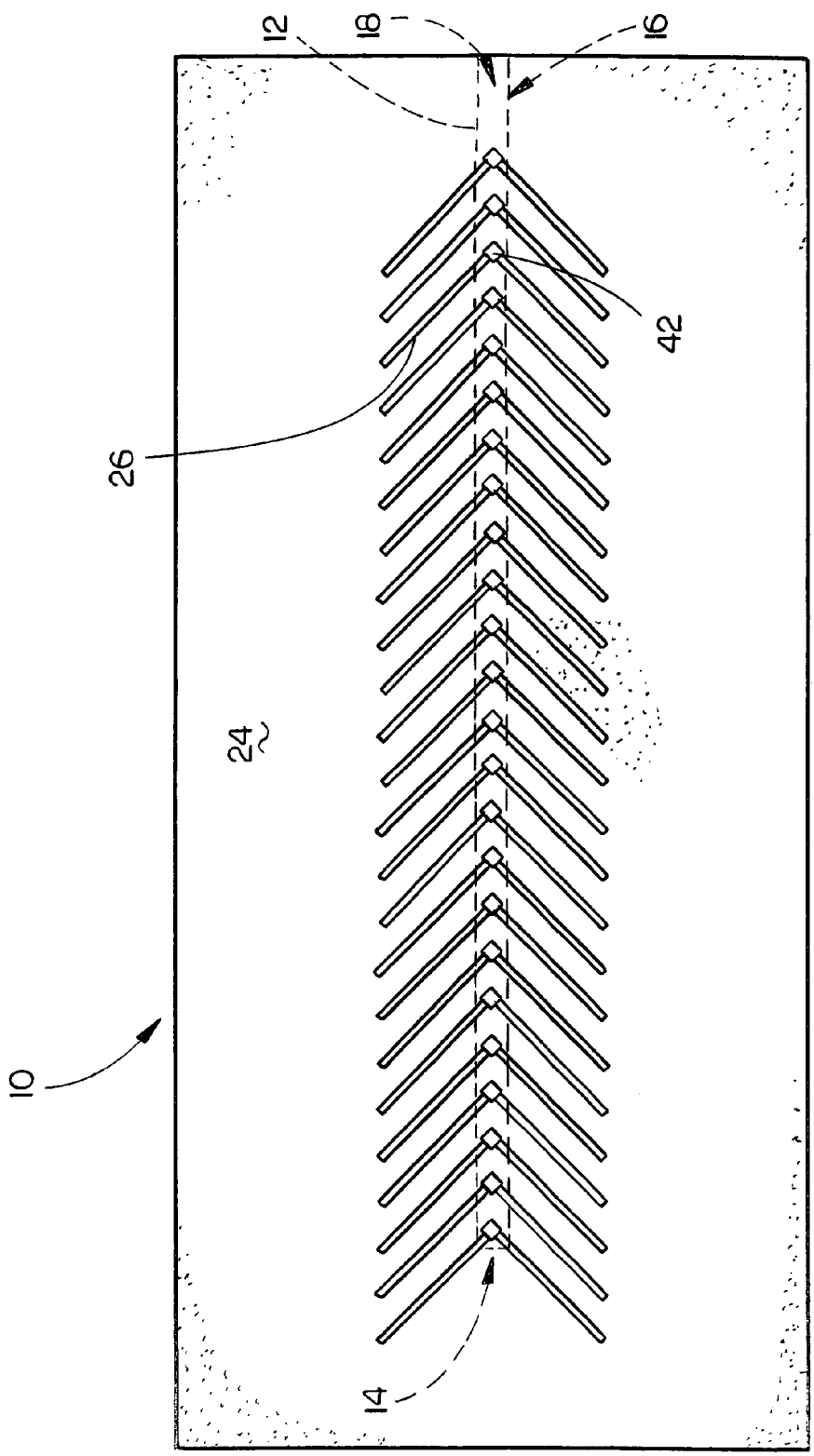
FIG. 2 is a top plan view of one embodiment of the composting system of the present invention.
Figure 3:
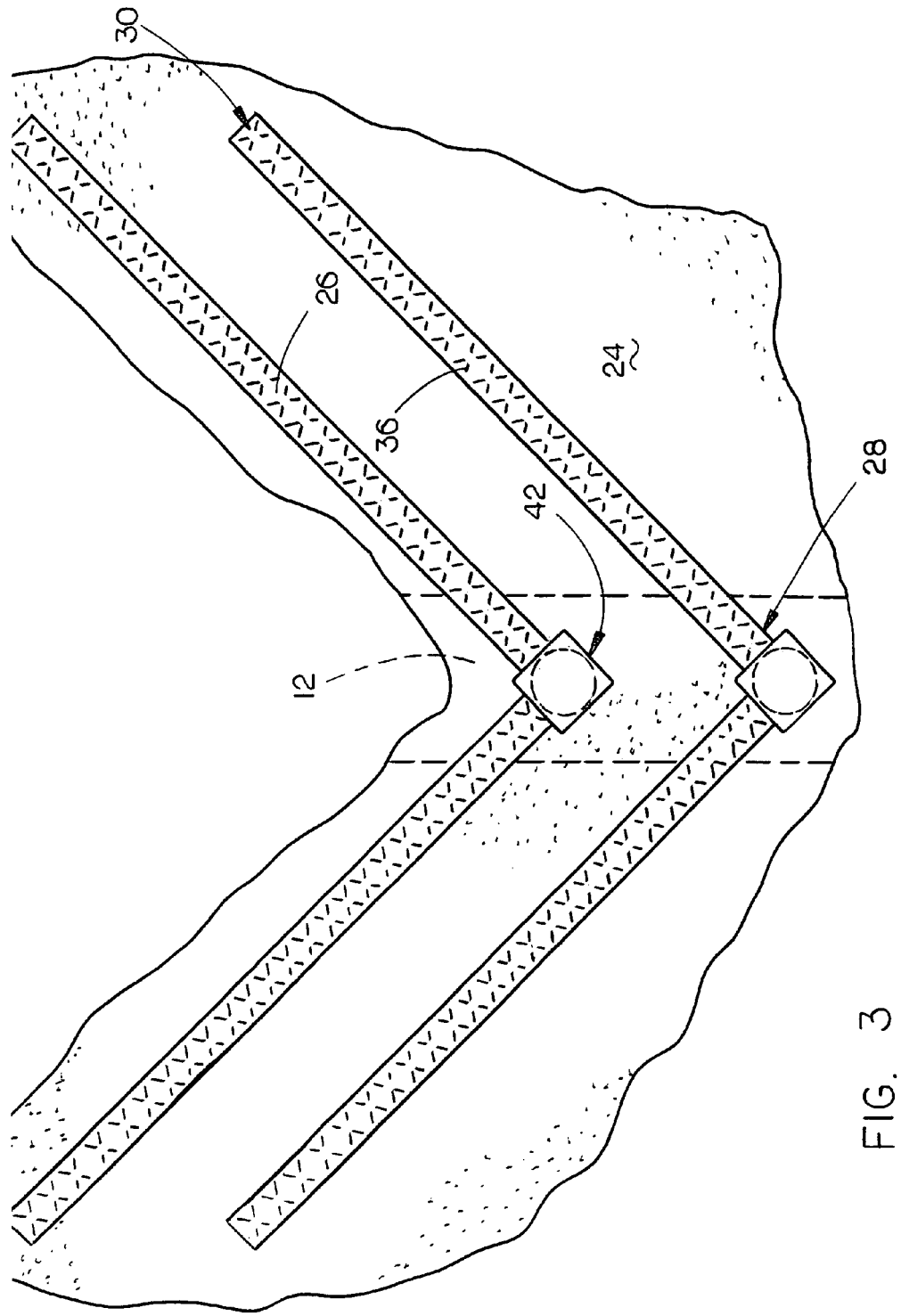
FIG. 3 is a partial, top plan view of aeration strips from the composting system depicted in FIG. 2.

In a preferred embodiment, the aeration strips 26 are positioned to extend away from the length of the central air duct 12 at an angle. Examples of this positioning are depicted in FIGS. 1-3. The angle of the aeration strips 26 relative to the length of the central air duct 12 can be varied to give more or less aeration within the composting material. It should be clear from the figures that as the angle of the aeration strips 26 decreases with respect to the length of the central air duct 12, a greater length of aerations strips 26 may be positioned beneath a pile of organic material, thus increasing aeration for a given spacing of hubs 42. Accordingly, increasing the relative angle between the aeration strips 26 and the length of the central air duct 12 up to the position of the aeration strips 26 being perpendicular to the central air duct will tend to decrease the available surface area of aeration strips 26 on which the pile of organic material may be positioned, thus decreasing the aeration for a given spacing of hubs 42. The herringbone pattern depicted in the figures is based on a forty-five degree angle. Positioning aeration strips 26 to extend away from both sides of the central air duct 12 in a horizontally spaced-apart relationship with one another will allow the transport of air through the sides and top of a pile of composting material toward, or away from, its center. Moreover, the spacing between the aerations strips 26 in the herringbone configuration enables the deck surface 24 to carry the vertical and lateral loads induced by the wheels or buckets of large material handling equipment whether the equipment approaches from the side or end of the system 10. As such, the herringbone pattern assures that the wheels or buckets of such heavy equipment never ride solely on the support surface 34 of the aeration strips 26 under normal approach directions toward the composting material, thus minimizing abrasive wear and structural loading on the aeration strips 26.

Figure 11:
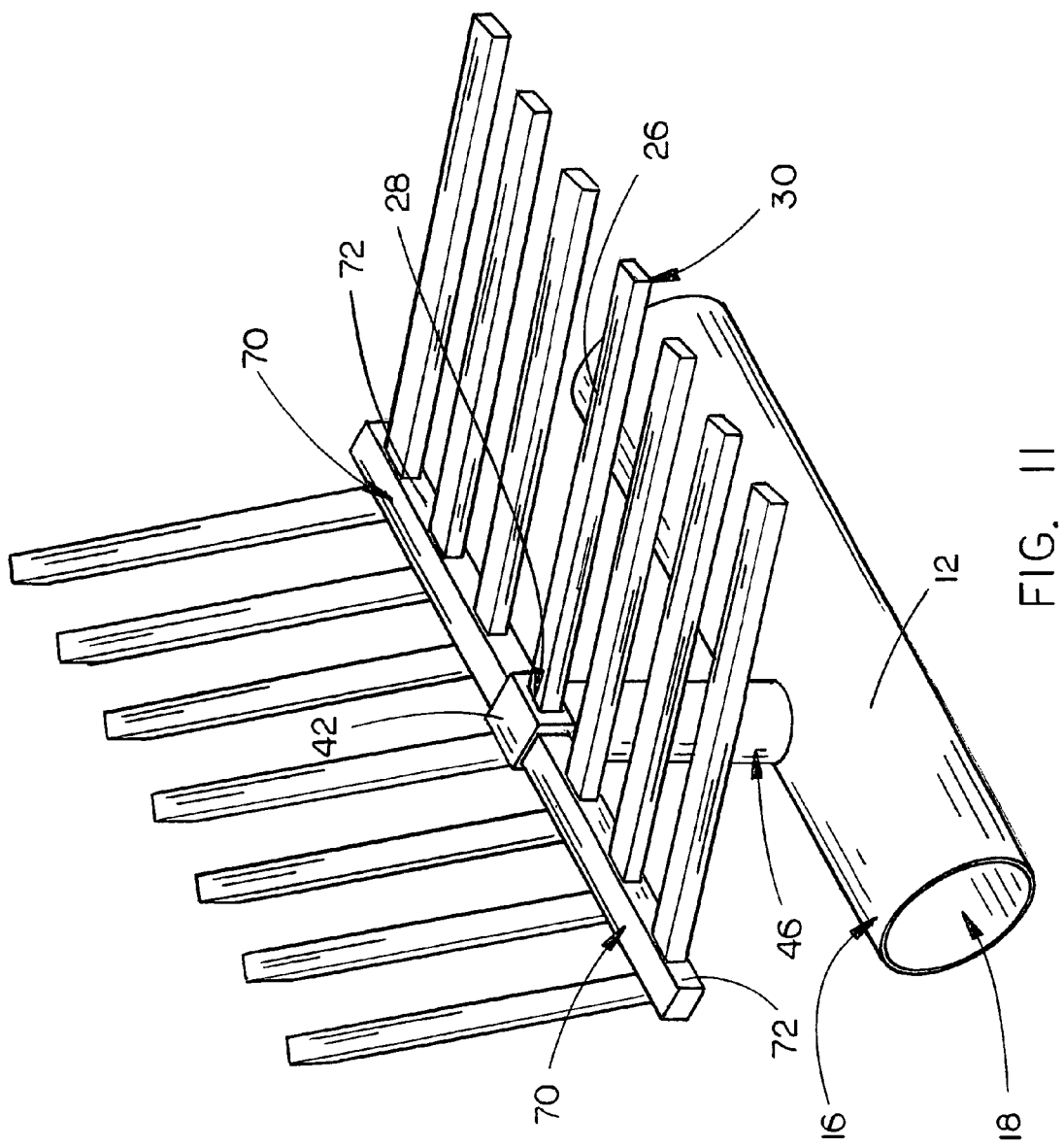
FIG. 11 is a partial perspective view of one embodiment of the composting system of the present invention demonstrating one potential arrangement of such a composting system.
Figure 12:
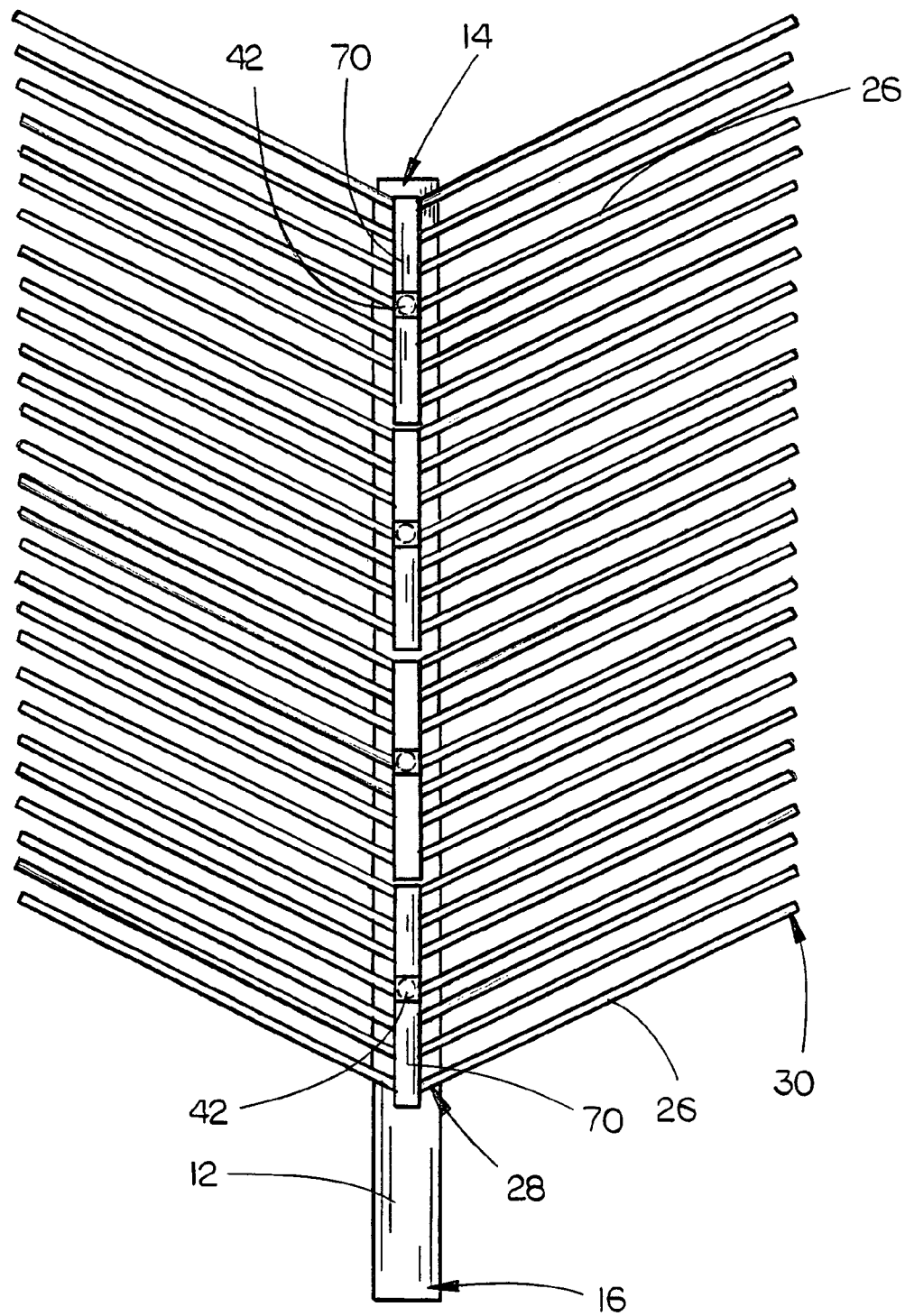
FIG. 12 is a top, plan view of one embodiment of the composting system of the present invention, demonstrating one potential arrangement of such a composting system by simultaneously using a plurality of aeration sections, similar to that depicted in FIG. 11.

In another embodiment of the aeration system 10, depicted in FIGS. 11 and 12, one or more manifolds 70 are used to couple a plurality of aeration strips 26 with the aeration hubs 42. In one aspect, the manifolds 70 may be generally elongated members, having an open airway extending between opposite end portions of the manifold. Side portions 72 of the manifolds 70 may be provided with openings, similar to the openings 50 in the aeration hubs 42, in order to place the interior of the manifolds 70 in open fluid communication with the open airways 32 of the aeration strips 26. End portions of the manifolds 70 may be provided with openings that may be placed closely adjacent the openings 50 of the aeration hubs 42. In this manner, fewer aeration hubs 42 may be required to properly operate the system 10. In one embodiment, the manifold 70 may be simply formed from elongated C-Channel members that are positioned within channels formed in the deck surface 24, similar to the manner in which the aeration strips 26 may be engaged with the deck surface 24. One or more of the afore-described aeration hubs 42 may be used in conjunction with the manifolds 70. In various embodiments, such as that depicted in FIG. 11, it is contemplated that at least one hub 42 may be directly coupled with one or more aeration strips 26 and one or more manifolds 70, simultaneously.

Figure 6:
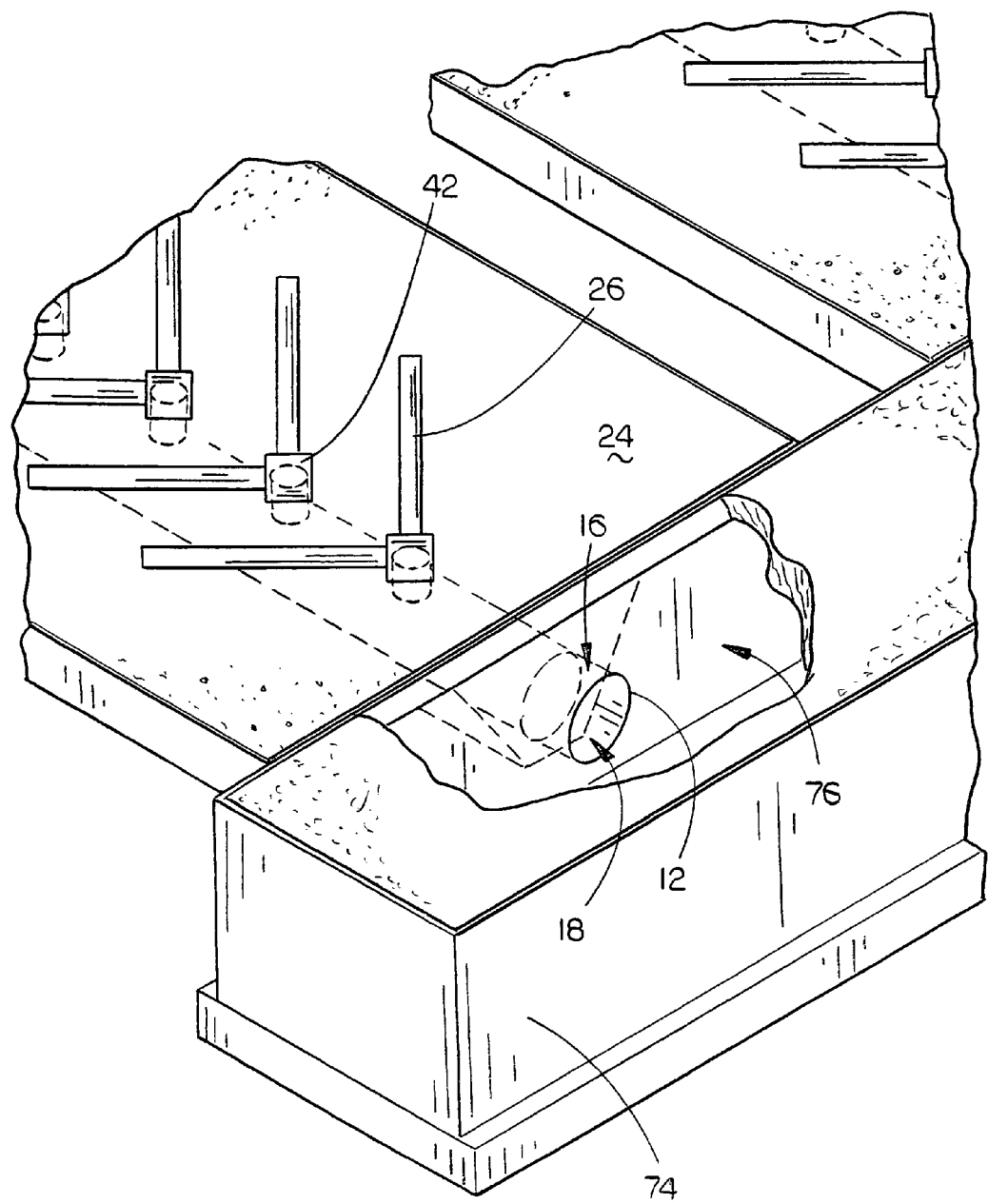
FIG. 6 is a partial, isometric view of a manifold trench and aeration floor assemblies as the same could be configured with one embodiment of the composting system of the present invention.

Air handling means should be provided for transporting air through the open air channel 18 of the central air duct 12 to or from within the aeration strips 26 and the open second end portion 16 of the central air duct 12. To accomplish this task, a wide variety of air handling units may be utilized, such as an in-line fan, and the like. The location of the air handling unit may depend upon a number of various operating factors, including the number of composting piles being serviced by the system 10, the number of central air ducts 12, and the like. In one preferred embodiment, the air handling equipment is positioned adjacent the open second end portion 16 of the central air duct 12. Where a plurality of central air ducts 12 are utilized within a single system 10, multiple air handling units may be required. In those instances where a plurality of central air ducts 12 are utilized within a single system 10, an elongated, common manifold trench 74, having an open airway 76 extending at least partially along the length of the manifold trench 74, may be used. In one preferred embodiment, the open second end portions 16 of the central air ducts 12 will be positioned to place the open air channels 18 of the central air ducts 12 in open fluid communication with the open airway 76 of the manifold trench 74, such as depicted in FIG. 6. Depending upon the overall size of the system 10 and the nature of the composting operations to be undertaken by the system 10, it is further contemplated that the air handling equipment may be provided as one or more units disposed directly within the open airway 76 of the manifold trench 74 in a manner that produces sufficient air flow through the central air duct 12. In one preferred method of operating the aeration system 10, organic material is positioned closely adjacent the support surfaces of the aerations strips 26 and the deck surface 24. In the examples depicted in the Figures, the piles of organic material are formed into elongated windrows 78. Other pile arrangements are contemplated for the composting material and will depend upon the particular composting operation undertaken. However, with the organic material in position, the air handling means may be actuated so that air in a negative aeration system is drawn through the windrows 78, into the open airways 32 of the aeration strips 26, into the open air channel 18 of the central air duct 12 and out the open second end portion 16 of the central air duct 12.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A method of composting organic material, comprising the steps of:

providing a central air duct having a first end portion, an open second end portion, a length that extends between said first and second end portions, and an open air channel that extends along at least a portion of said length;

providing a plurality of elongated aeration strips, having first and second end portions, a support surface that extends between said first and second end portions and an open airway beneath said support surface; said support surface having a plurality of vent openings that are positioned to be in open fluid communication with said airway; the first end portions of said aeration strips being operatively coupled with said central air duct in a manner that places said open airway in open fluid communication with said open air channel;

providing air handling means for transporting air through said plurality of aeration strips and said central air duct;

positioning the organic material closely adjacent the support surfaces of said aeration strips;

actuating said air handling means so that air is transported through the organic material, said aeration strips, and said central air duct;

providing a plurality of aeration hubs, having open first and second end portions and an open airway extending between said first and second end portions, in a spaced relationship with one another along the length of said central air duct; said first end portion of said aeration hubs being placed in open fluid communication with the open airway of one or more of said plurality of aeration strips; said second end portion of said at least one aeration hub being placed in open fluid communication with the open air channel of said central air duct;

said aeration strips being positioned to extend away from said central air duct at an angle with respect to the length of said central air duct;

at least one of said aeration strips extending away from each of two generally opposite sides of the first end portions of a plurality of said aeration hubs so that a plurality of said aerations trips extend away from a first side of said central air duct and a plurality of said aerations trips extend away from a second side of said central air duct;

two generally opposite sides of the first end portions of a plurality of said aeration hubs are each provided with openings that place the open airways of said aerations trips in open fluid communication with the open air channel of said central air duct;

at least one of said aeration hubs being provided with an air control insert that is rotatably coupled within the first end portion of said at least one aeration hub; said air control insert having a top wall and a generally annular sidewall that extends down from said top wall; said sidewall having openings that are positioned along said sidewall so that said air control insert may be selectively moved between an open position, which aligns the openings in said air control insert with the openings in the sides of the first end portion of said aeration hub and permits fluid to pass between said open airways of said aeration strips and the open air channel of said central air duct, and a closed position, which substantially prohibits fluid to pass between said open airways of said aeration strips and the open air channel of said central air duct.

2. The method of claim 1 wherein said air control insert being provided with a handle at said top wall so that the air control insert may be manually moved between said open and closed positions.

* * * * *